United States Patent [19]

Lukas et al.

[11] Patent Number: 4,735,481

[45] Date of Patent: Apr. 5, 1988

[54] FUSION APPARATUS FOR JOINING TWO MONOMODE OPTICAL FIBERS

[75] Inventors: Helmut H. Lukas, Carleton Place; Grant K. Pacey, Stittsville; Kevin G. Caldwell, Ottawa, all of Canada

[73] Assignee: Northern Telecom Limited, Montreal, Canada

[21] Appl. No.: 876,595

[22] Filed: Jun. 20, 1986

[30] Foreign Application Priority Data

Feb. 13, 1986 [CA] Canada ................................. 501,817

[51] Int. Cl.⁴ ................................................. G02B 6/36
[52] U.S. Cl. ................................. 350/96.20; 350/96.21
[58] Field of Search ............... 350/96.20, 96.21, 96.22; 219/121 P, 121 PS, 121 PX

[56] References Cited

U.S. PATENT DOCUMENTS 4,274,707 6/1981 Pacey et al. ..................... 350/96.2
4,687,287 8/1987 Lukas et al. ..................... 350/96.2

OTHER PUBLICATIONS

Hatakeyama et al., "Fusion Splices for Single-Mode Optical Fibers", *IEEE J. of Quantum Electronics*, V. QE-14, No. 8, Aug. '78, pp. 614–619.
Kato et al., II, "Arc-Fusion Splicing of Single-Mode Fibers: An Apparatus with an Automatic Core-Axis Alignment Mechanism and Its Field Trial Results", *J. of Lightwave Technology*, vol. LT-2, No. 4, Aug. '84, pp. 442–447.
Kato et al., "Arc-Fusion Splicing of Single-Mode Fibers, 2: A Practicle Splice Machine", *Applied Optics*, vol. 21, No. 11, Jun. 1982, pp. 1916–1921.

*Primary Examiner*—John Lee
*Assistant Examiner*—Michael Menz
*Attorney, Agent, or Firm*—Sidney T. Jelly

[57] ABSTRACT

Fusion splicing apparatus for fusion splicing pairs of single mode optical fibers has a fusion head having two spaced guiding and locating members mounted on hinge members. One hinge member moves a guiding and locating member up and down, the other hinge member moves the other guiding and locating member forward and back. Actuation of the hinge member is by stepping motors and micrometers. The fibers are held in the guiding and locating members by clamping members, one of which can be pivotted to move a holding member at its upper end laterally. The fiber cores can be aligned axially by actuation of the hinge members and the fiber ends can be separated and pushed together by pivotting the pivot clamping member. Light signal input and detecting modules can be positioned either side of the fusion head. Detected light signals can be used to operate the stepping motor to give automatic alignment. Arc electrodes are provided for giving a preclean arc, a softening arc and a fusion arc.

14 Claims, 11 Drawing Sheets

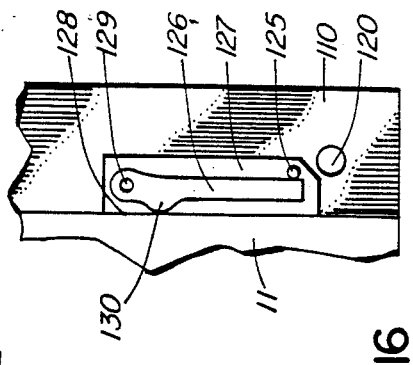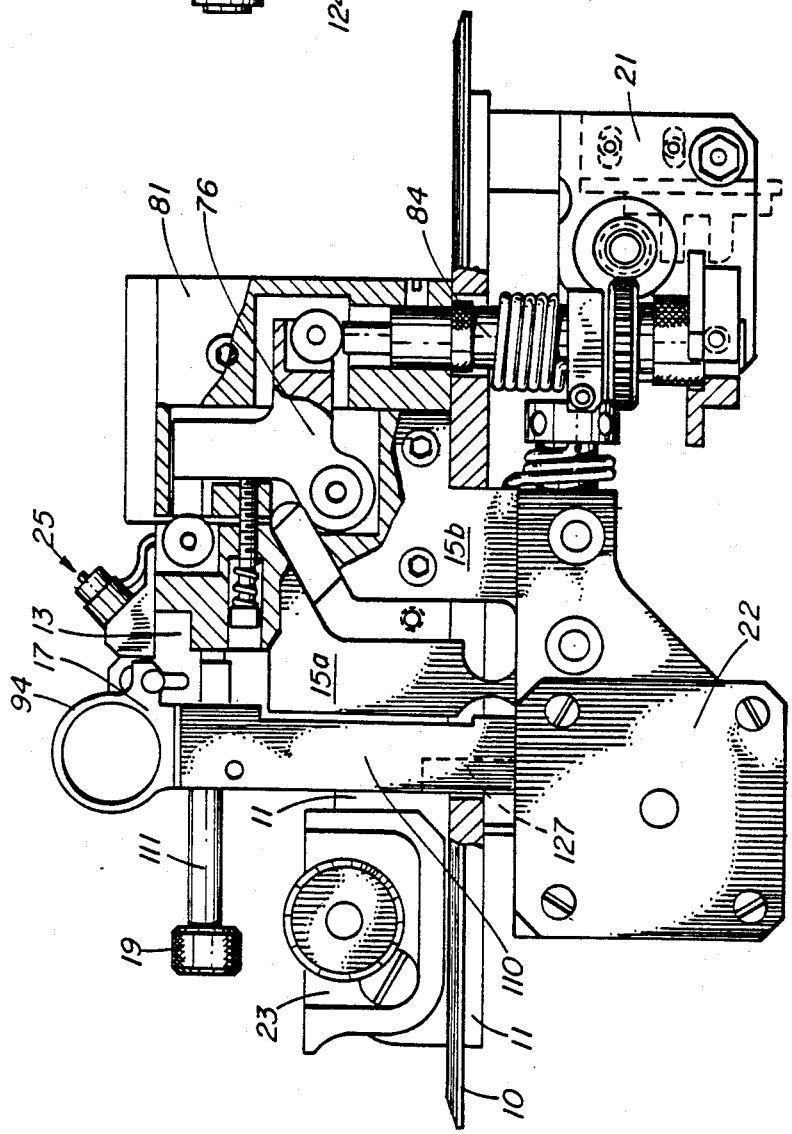

FUSION APPARATUS FOR JOINING TWO MONOMODE OPTICAL FIBERS

This invention relates to a fusion apparatus for joining two monomode optical fibers in an accurate end-to-end axial alignment.

In joining a pair of monomode optical fibers, very accurate positioning of the fibers, end-to-end, is essential. Particularly, the light transmitting cores of the fibers must be accurately aligned, axially, to provide the highest efficiency possible, that is, the lowest attenuation, and degradation, of the light signal being transmitted through the fibers, across the joint.

During fusion the fibers must be held in the correct positional relationship. The fibers must be capable of movement in directions normal to their axes, relative to each other, for alignment, and also be capable of movement axially to move fibers apart and then together again, during the alignment and fusion steps.

The present invention provides a fusion apparatus in which opposed fibers are each held in a guiding and locating member, in a fusion head, the guiding and locating members being movable in directions normal to each other and normal to the fiber axes. Clamping members hold the fibers in the guiding and locating members, and the fibers can be moved endwise, or axially, by a laterally movable member in each clamping member and by lateral movement of one clamping member relative to the other. Positioned either side of the fusion head are launch and detect modules, a launch module on one side and a detect module on the other. A light signal can be injected into one fiber by the launch module and detected, by the detect module, in the other fiber. Alignment of the fibers to provide a maximum signal can be obtained automatically or by manual actuation. A fusion arc device is mounted between the guiding and locating members.

The invention will be readily understood by the following description of an embodiment, by way of example, in conjunction with the accompanying drawings, in which:

FIG. 14 is a side view similar to that of FIG. 4 with the motor omitted in FIG. 4 shown in position;

FIG. 15 is an enlarged detail of a worm gear as used in association with the motor shown in FIG. 14 and omitted in FIG. 4;

FIG. 16 is an enlargement of a lever arrangement positioned in the lower part of clamping member 17;

Figure 1:
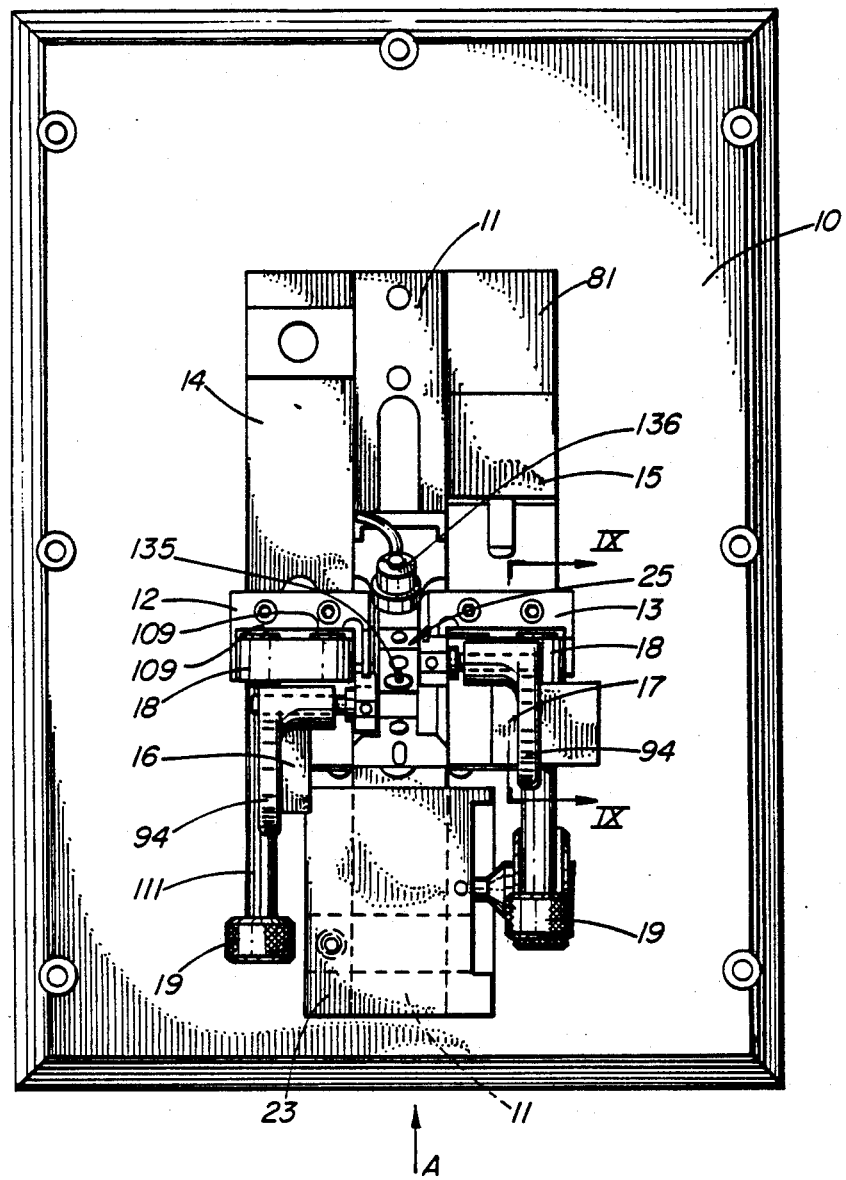
FIG. 1 is a top plan view of the fusion head.
Figure 2:
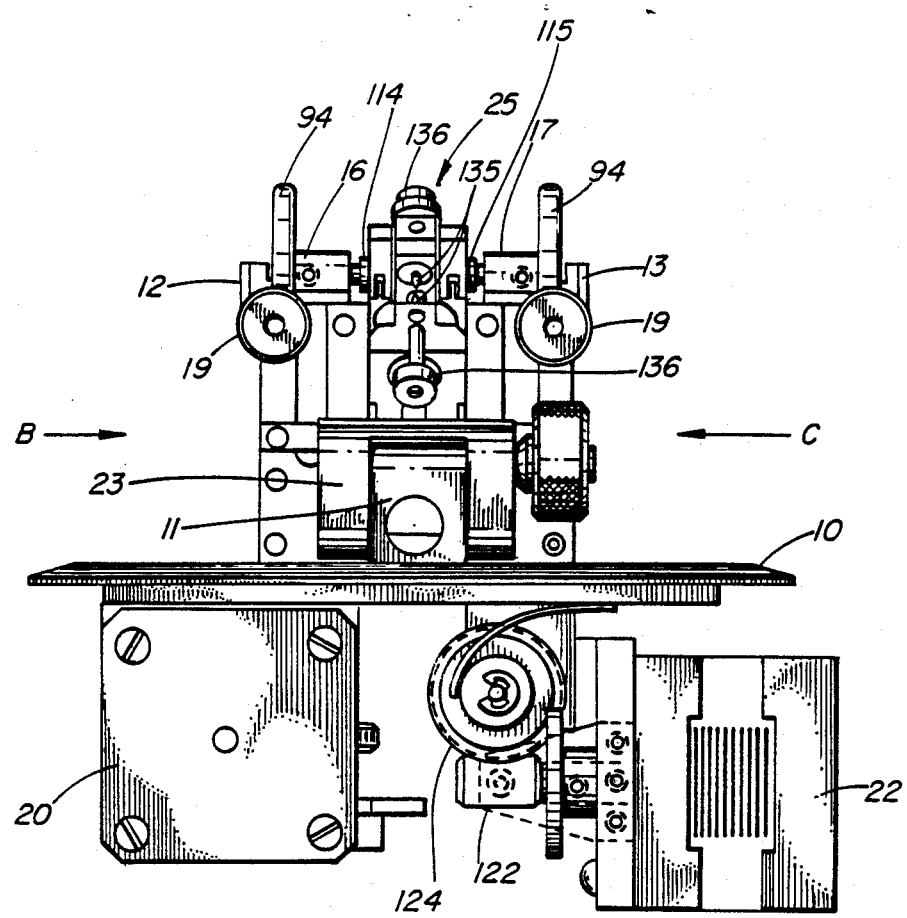
FIG. 2 is a front view in the direction of arrow A in FIG. 1.
Figure 3:
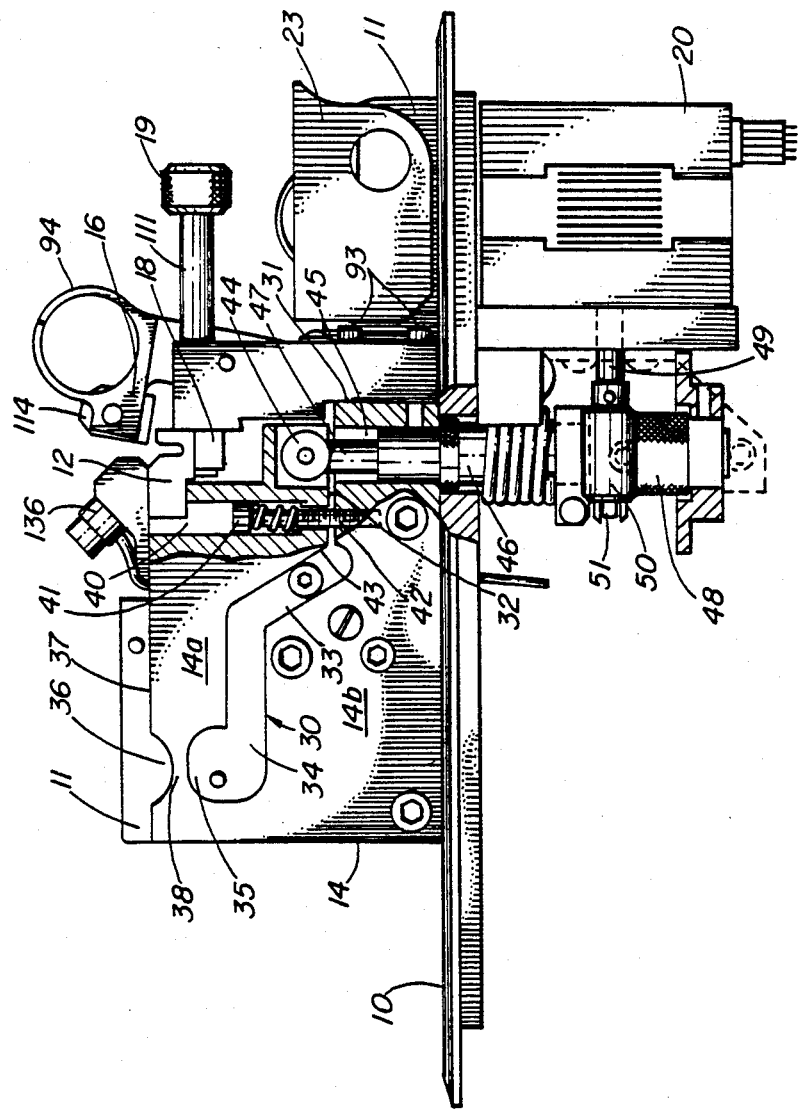
FIG. 3 is a side view on the fusion head, partly sectional, in the direction of arrow B in FIG. 2.
Figure 4:
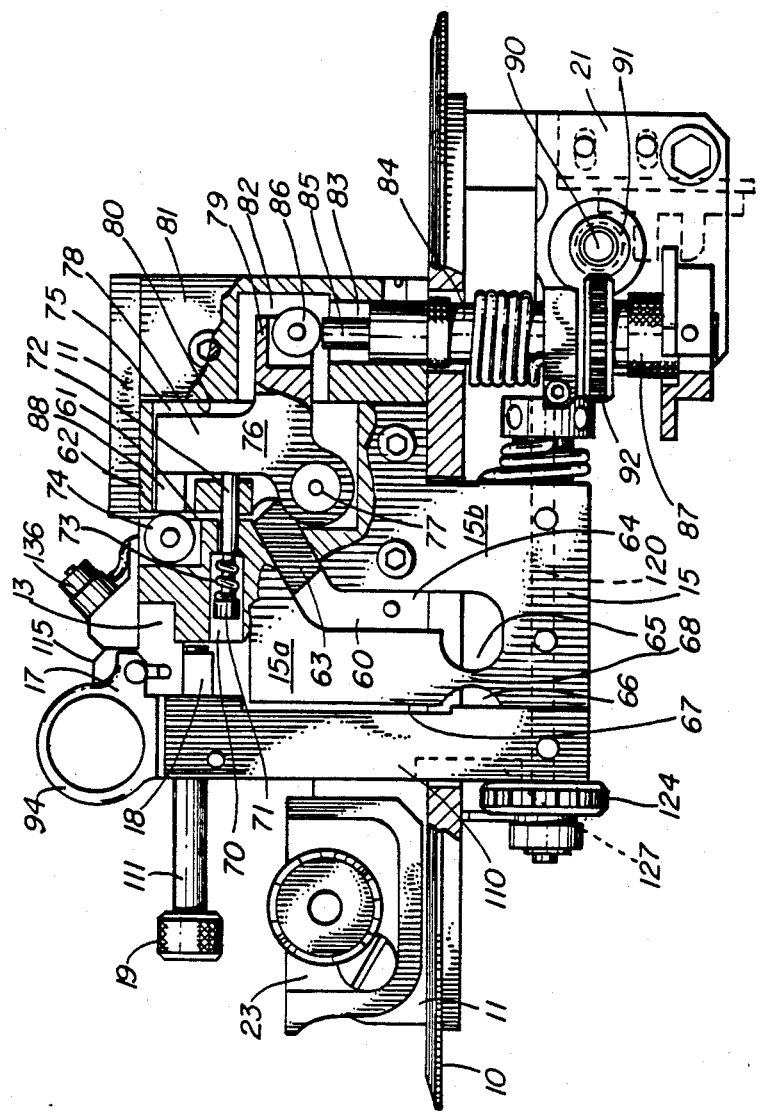
FIG. 4 is a side view, partly sectional, in the direction of arrow C in FIG. 2, with one motor removed for clarity.

FIGS. 1 to 4 illustrate a fusion head for a fusion splicer for splicing of optical fibers. The fusion head is shown mounted on a mounting plate 10, by which the fusion head assembly is mounted on the deck of a fusion splicing apparatus. The head has a backbone member extending right through the fusion head, indicated generally at 11. Two guiding and locating members 12 and 13 are mounted on the base by means of integral hinge members 14 and 15. The hinge members, seen more clearly in FIGS. 3 and 4, provide for movement of the guiding and locating members 12 and 13 relative to each other for alignment of optical fibers held in the members. Thus, in the example, hinge member 14 provides vertical reciprocal movement of member 12 and hinge member 15 provides reciprocal movement, forward and backward, of member 13, normal to the direction of movement of member 12.

Clamping or holding members 16 and 17 hold optical fibers in the guiding and locating members. The clamping members can be placed in two positions: open and closed. In the open position the fiber is released, in the closed position the fiber is held down firmly and securely in the guiding and locating members. Each guiding and locating member has a laterally movable member, in the example in FIG. 1 an endless belt 18. In addition to holding the fiber in the guiding and locating member, the clamping member also holds the fiber down on the laterally movable member. Movement of the laterally movable member is by rotation of a positioning knob 19.

The guiding and locating members 12 and 13 are spaced apart a short distance to provide a narrow gap in which is mounted an arc generating assembly indicated generally at 25. Mounted below the mounting plate 10 are stepping motors 20, 21 and 22. As illustrated also in FIGS. 3 and 4, stepping motors 20 and 21 actuate the hinge members 14 and 15 and stepping motor 22 provides for axial movement of the fibers, relative to each other. The form, and operation, of each of these various items will be described in more detail individually. A microscope mounting position is provided at 23 for mounting a microscope, by which the positions of the opposed ends of the fiber, and the fused joint, can be viewed and monitored.

The hinge members 14 and 15 are seen in more detail in FIGS. 3 and 4, together with the actuating arrangement, including the associated stepping motors 20 and 21. Considering first the hinge member 14 illustrated in FIG. 3, this is composed of a block of material, for example of metal, having a slot, indicated generally at 30, extending in from a front surface 31. Slot 30 has a first, relatively narrow, section 32 which, in the example, extends normal to the surface 31. The slot then widens to a second section 33 which is inclined rearwards and upwards, and then continues rearward as a third section 34. At the rear end of the third section 34, the slot has an upwardly extending channel 35. A shallow channel 36 is formed in the top surface 37 of the hinge member, channel 36 aligned with channel 35 to form a thin neck portion 38. The slot 30 and channels 35 and 36 extend right across the hinge member, thus dividing the hinge member into upper and lower parts 14(a) and 14(b) joined by the thin neck portion 38 between the channels 35 and 36. The neck acts as a hinge or pivot point.

In a bore 40 extending down in the upper part 14(a) there is positioned a screw 41 which screws into a threaded bore 42 in the lower part 14(b). A compression spring 43 extends between the head of the screw 41 and a ledge in the bore 40. After assembly of the apparatus, the initial vertical adjustment of guiding and locating member 12 can be obtained by screw 41. At the front of the upper part 14(a) a roller 44 is mounted, and a bore 45 is formed in the lower part 14(b) extending up from the bottom of the hinge member, the bore 45 being in alignment with the roller 44. Mounted on the undersurface of plate 10 and extending through the bore 45, is a micrometer member 46. The spindle 47 of the micrometer bears on the roller 44. Rotation of the micrometer causes extension and retraction of the spindle 47, depending upon the direction of rotation of the micrometer. This causes the upper part 14(a) of the hinge member to hinge about the neck 38. A knob 48 enables initial manual adjustment, on assembly. Once assembly is complete, the micrometer is rotated by the stepping motor 20. The shaft 49 of the motor carries a worm gear 50 which engages with a worm wheel gear 51 attached to the rotating member of the micrometer. Rotation of the motor in one direction or the other rotates the micrometer and thus causes extension or retraction of the micrometer spindle 47.

Mounted at the front of the upper part 14(a) of the hinge member 14 is the guiding and locating member 12. This member is seen in more detail in FIGS. 6, 7 and 8, and described later.

FIG. 4 illustrates the hinge member 15 and associated items. Hinge member 15 is composed of a block, for example of metal, similar in form to hinge member 14. However, in effect, the hinge member is rotated through 90°. A slot 60 divides the hinge member into front and back parts 15(a) and 15(b). Slot 60 has a narrow first section 61 extending down from a top surface 62. The slot then has a second, wider, section 63 extending down and forwardly, finally extending as a third section 64 downwardly. At the lower end of the section 64 is a forwardly extending channel 65. A shallow channel 66 is formed in the front surface 67 of the back part 15(a), the channels 65 and 66 being aligned and defining a thin neck portion 68. Slot 60 and channels 65 and 66 extend right across the hinge member, the parts being hinged at the neck portion 68.

A bore 70 extends in from the front of the back part 15(a) and a screw 71 in the bore 70 extends into a threaded bore 72 in the front part 15(b). A compression spring 73 is positioned between the head of the screw 71 and a step in the bore 70. As with hinge member 14, after assembly of the apparatus the initial horizontal adjustment of guiding and locating member 13 can be obtained by screw 41. A roller 74 is mounted at the top back edge of the front part 15(a). The back part 15(b) has a large slot 75 formed in it, the slot extending vertically and in a front to back direction. The slot 75 houses an L-shaped lever 76 pivotted at 77 at the lower front part of the slot. The lever has two lever arms 78 and 79, arm 79 extending rearward out of the hinge member. Mounted on the rear face 80 of the back part 15(b) is a further block 81. A recess 82 is formed in the block 81 for reception of the lever arm 79. In a bore 83 is mounted a micrometer 84, the spindle 85 of which bears against a roller 86 mounted at the end of the lever arm 79. The micrometer can be rotated for initial set up by a knob 87. Rotation of the micrometer causes the spindle to extend or retract, depending upon the direction of rotation of the micrometer. Movement of the spindle 85 pivots the lever 76. An extension 88 on the upper end of the lever arm 78 bears against the roller 74 and pivotting of the lever 76 will cause the front part 15(a) of the hinge member 15 to hinge about the neck portion 68. Once assembly is complete, the micrometer is rotated by stepping motor 21. The shaft 90 of the motor carries a worm gear 91 which engages with a worm wheel 92 on the rotatable part of the micrometer. Mounted at the front top corner of the front part 15(a) of the hinge member 15 is the guiding and locating member 13. Guiding and locating member 13 is of the same form as support member 12, but of the opposite hand.

Figure 6:
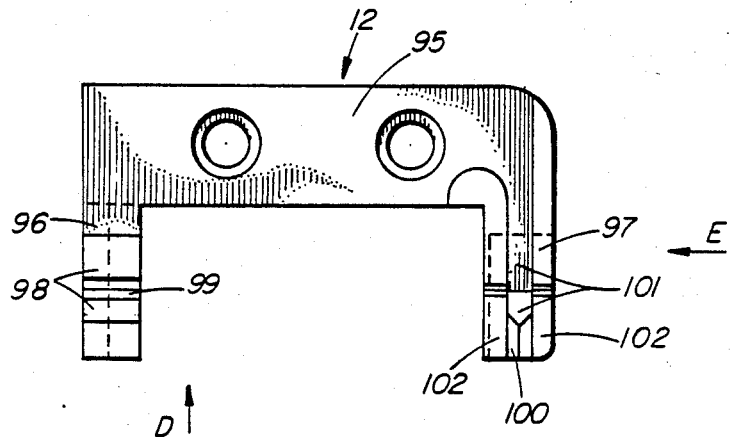
FIG. 6 is a toP plan view of a guiding and alignment member, to an enlarged scale for clarity.
Figure 7:
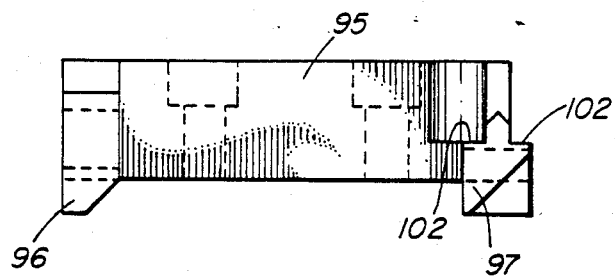
FIG. 7 is a front view in the direction of arrow D in FIG. 6.
Figure 8:
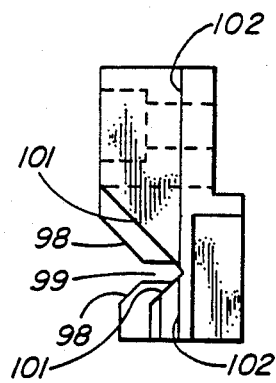
FIG. 8 is an end view in the direction of arrow E in FIG. 6.

FIGS. 6, 7 and 8 illustrate guiding and locating member 12 in more detail. As seen in FIG. 6, member 12 has an elongate back part 95 and two forwardly extending arms 96 and 97. Arm 96 has a Vee-shaped formation 98 in its top surface, the bottom of the groove extending in the form of a parallel sided slot 99. Arm 97 has its upper surface in three sections. The center section 100 has a Vee-shaped formation 101 in its upper surface. The center section is quite thin and on either side of the center section is a section having a flat surface, indicated at 102. The flat surfaces 102 are positioned just above the apex of the Vee in the center section 100. An optical fiber positioned in the apex of the Vee formation projects a very small amount above the level of the flat surfaces 102. The Vee formations 98 and 101 are aligned about a common axis, being the axis of a fiber in the guiding and locating member, but the Vee formation 101 is lower than formation 98. When a fiber is in the member 12, it rests in the slot 99 at one end of the guiding and locating member and is held down in the apex of the Vee formation 101. The Vee formation 98 and slot 99 only generally guide the fiber while the Vee formation 101 accurately locates the fiber. Vee formation 98 and slot 99 ensure that a fiber extends along the guiding and locating member beneath the clamping member and could be of other forms.

Guiding and locating member 13 is of the same form as member 12, but is of opposite hand. That is, relative to FIGS. 6 and 7, arm 96 is at the right hand side and arm 97 is at the left hand side. The Vee formations 98 and 101, slot 99 and surfaces 102 are all formed on the related arms. On the fusion head, when assembled, the arms 97, with the associated formations, are opposed to each other, either side of the arc generating assembly 25. The arms 96 are on the sides of arms 97 remote from the arc generating assembly.

The Vee formations 101 of the two members 12 and 13 are aligned on initial assembly by manual actuation of the micrometers 46 and 84, guiding and alignment member 12 being moved vertically and guiding and alignment member 13 being moved horizontally, as seen in FIGS. 3 and 4.

Fibers to be joined are held in the guiding and locating members 12 and 13 by the clamping members 16 and 17. One of the clamping members, member 17, is illustrated in more detail in FIGS. 9 and 10. This is the right hand clamping member in FIGS. 1 and 2. Clamping member 16 is very similar to member 17, the differences being that member 16 is of opposite hand to member 17, and also member 16 is shorter. This latter difference is because member 16 is mounted directly on the front surface 31 of the hinge member 14, while member 17 is pivotally mounted on the hinge member 15 below the mounting plate 10. Member 16 is mounted on the hinge member by screws 93. A ring 94 is provided on each clamping member and the rings 94 are on opposite sides of members 16 and 17.

Figure 9:
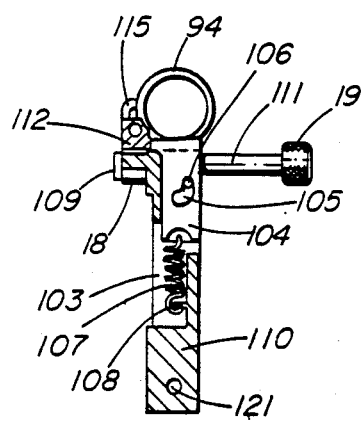
FIG. 9 is a cross-section on the line IX—IX of FIG. 1, illustrating the arrangement of a clamping member, the clamping member in a closed condition.
Figure 10:
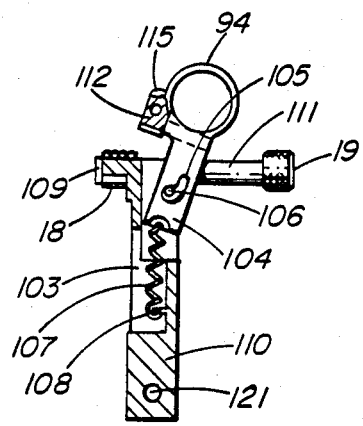
FIG. 10 is a similar view to that of FIG. 9, but with the clamping member in an open condition.

Considering FIGS. 9 and 10, a clamping member comprises a main body portion 110, attached, as described above, to a hinge member. At the top end of the main body portion is a groove 103 into which fits a spring biased portion or holding member 104. The holding member 104 has an L-shaped slot 105 through which passes a pin 106. The pin is mounted in the main body portion and the member 104 can move up and down, and pivot on, the pin. A tension spring 107 is attached at one end to the bottom of the member 104 and at its other end to an anchor 108 near the bottom of the groove 103. At the upper end of the main body portion 110 a laterally movable member is provided. In the example, this is the endless belt 18. Two rollers 109 extend rearward, with the endless belt 18 extending around the rollers. This can be seen at the left hand mounting position in FIG. 1. The belt 18 extends between the arms 96 and 97 of the associated guiding and locating members 12 and 13. The knob 19 is connected by a shaft 111 to one of the rollers. On the member 104 a projection 112 extends over the belt 18, in the closed position, holding a fiber in contact with the belt. In the open position, the projection 112 is clear of the belt to permit positioning of a fiber in or removal of a fiber from a guiding and locating member. In the closed position, the pin 106 is in the vertical portion of slot 105 and the spring 107 provides a bias holding the projection 112 down on any fiber resting on the belt. In the open position, the pin 106 is in the lateral portion of the slot 105. This lateral portion of the slot has a slight recess at its end, extending upward, and the pin rests in this recess, under the bias of the spring 107. To close, the ring 94 is lifted up slightly to cause the pin to be out of the recess, and then the portion 104 swings across and down. In the reverse action, to open, the ring 94 is lifted and then swings over until the pin 106 is at the end of the lateral portion of the slot 105. The ring is then moved down slightly to engage the pin in the recess.

Instead of an endless belt 18, which can be used to move a fiber axially, other forms of movable members can be used. One such alternative is a rack and pinion arrangement. A small pinion is provided at the end of shaft 111 and a rack slides in a groove on the clamping member. The fiber is held down on the top surface of the rack when the clamping member is closed and rotation of the knob 19 and shaft 111 can move the rack one way or the other. The rack is spring biased to a somewhat central or neutral position for movement in either direction. When moved when the clamping member is closed, the rack will stay in whatever position it is moved to by rotation of knob 19. On opening of the clamping member, the rack will return to its neutral position.

Figure 11:
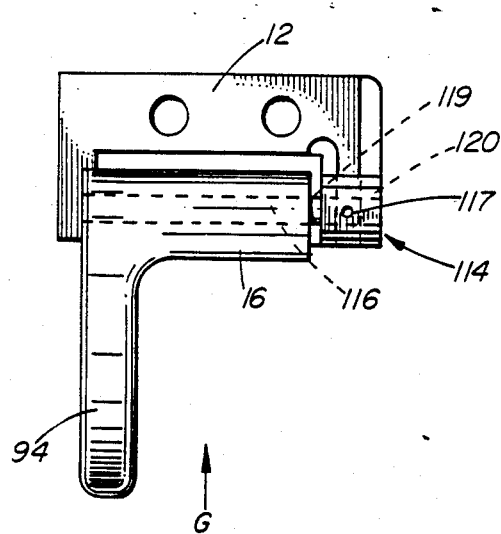
FIG. 11 is a top plan view on the top of a clamping member, to a larger scale for clarity.
Figure 12:
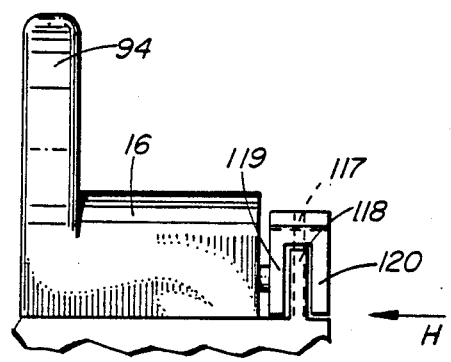
FIG. 12 is a front view in the direction of arrow G in FIG. 11.
Figure 13:
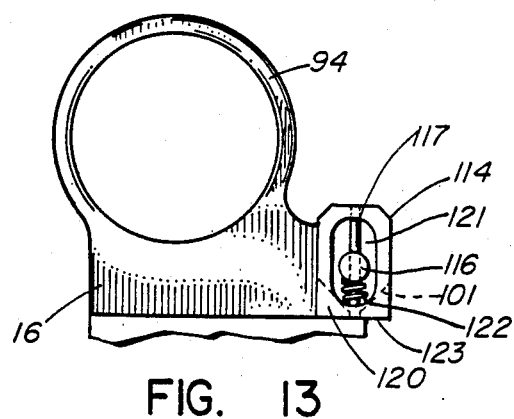
FIG. 13 is an end view in the direction of arrow H in FIG. 12.

Each clamping member also carries a spring biased pressure member which pushes down on a fiber in the Vee formation 101 of each guiding and locating member 16 and 17. These pressure members are shown at 114 and 115 in FIGS. 1, 2 and 3. A Pressure member is seen in more detail in FIGS. 11, 12 and 13, which illustrate the top portion of clamping member 16. A rod 116 extends laterally from the member 112. The pressure member 114 is mounted at the end of the rod by a pin 117. The pressure member is slotted, at 118, to straddle the Vee formation 101 of the related guiding and locating member 12, forming parallel legs 119 and 120. The pin 117 extends upwardly from the end of the rod 116, through the top of the pressure member 114. This retains the pressure member on the rod 116. The rod 116 is positioned in an elongate aperture 121 in the pressure member and a spring 122 is positioned between the rod 116 and the bottom of aperture 121 to bias the pressure member down. As the clamping member is closed, the bottom surfaces 123 of the legs 119 and 120 push down on any fiber positioned in the guiding and locating member 12, urging it into the bottom of the Vee formation 101. The pressure member moves up as contact is made with the fiber as the clamping member moves to the closed position.

Figure 5:
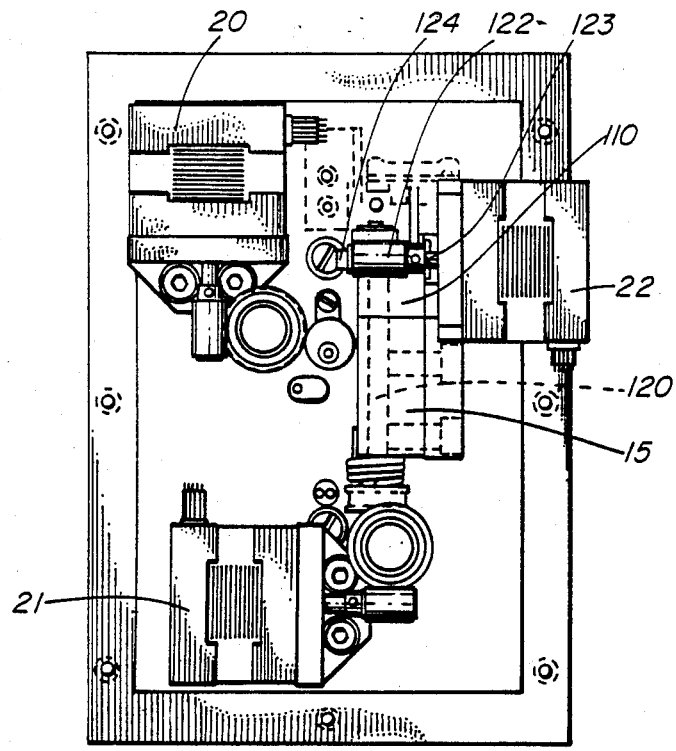
FIG. 5 is a bottom plan view, showing the positions of the stepping motors.

The right hand clamping member 17, as seen in FIGS. 1 and 2, is mounted for pivotal movement laterally about an axis below the mounting plate 10. As seen in FIG. 4, the hinge member 15 extends down below plate 10, and this is also seen in FIG. 5. A shaft extends front to back in the lower part of hinge member 15, indicated in dotted outline at 120 in FIGS. 4 and 5. The clamping member 17 is pivotally mounted on the shaft via a bore 121, seen in FIGS. 9 and 10. Motor 22 has a worm gear 122 mounted on the motor shaft 123, the worm gear engaging with a worm wheel 124. This is seen in FIGS. 2 and 5. Illustrated in FIG. 15 is a detail of the worm wheel 124. The worm wheel has a pin 125 extending parallel to the rotational axis of the worm wheel, the pin being close to the periphery of the worm wheel.

The pin 125 is adapted to engage against the free end of a lever pivotally mounted in a slot in the lower part of the body portion 102 of the clamping member. This is seen in FIG. 16. A lever 126 is positioned in a slot 127 formed in the lower part of body portion 102, the slot extending in from surface 128, which surface abuts the backbone member 11. The lever 126 is pivotally mounted on the body portion 102 at its upper end, at 129, and has a projection 30 on one side, in contact with the member 11. On rotation of the worm wheel 124, anticlockwise as in FIG. 2, the pin 125 pushes against the lower end of the lever 126. Lever 126, by means of projection 130, pushes against the member 11 and causes the pivot point 129 to move in the opposite direction to the movement of the lower end of the lever. This causes the body portion 103 to pivot about the shaft 120 and causes the upper end of the clamping member to move sideways. This will move a fiber held between the laterally moving member, i.e. belt 18, and the guiding and locating member to be moved sideways. These movements are very small. For example, the sideways movement of the top end of the clamping member 17 is about 0 um.

The arc generating assembly comprises two electrodes 135. The electrode tips are spaced apart a small distance and the arrangement is such that when two fibers are positioned on the support members 12 and 13, held in place by the gripping members 16 and 17, the opposed ends of the fibers are positioned in the gap between the electrodes. The electrodes are held in electrode holders 136 to which electrical power is supplied.

Figure 17:
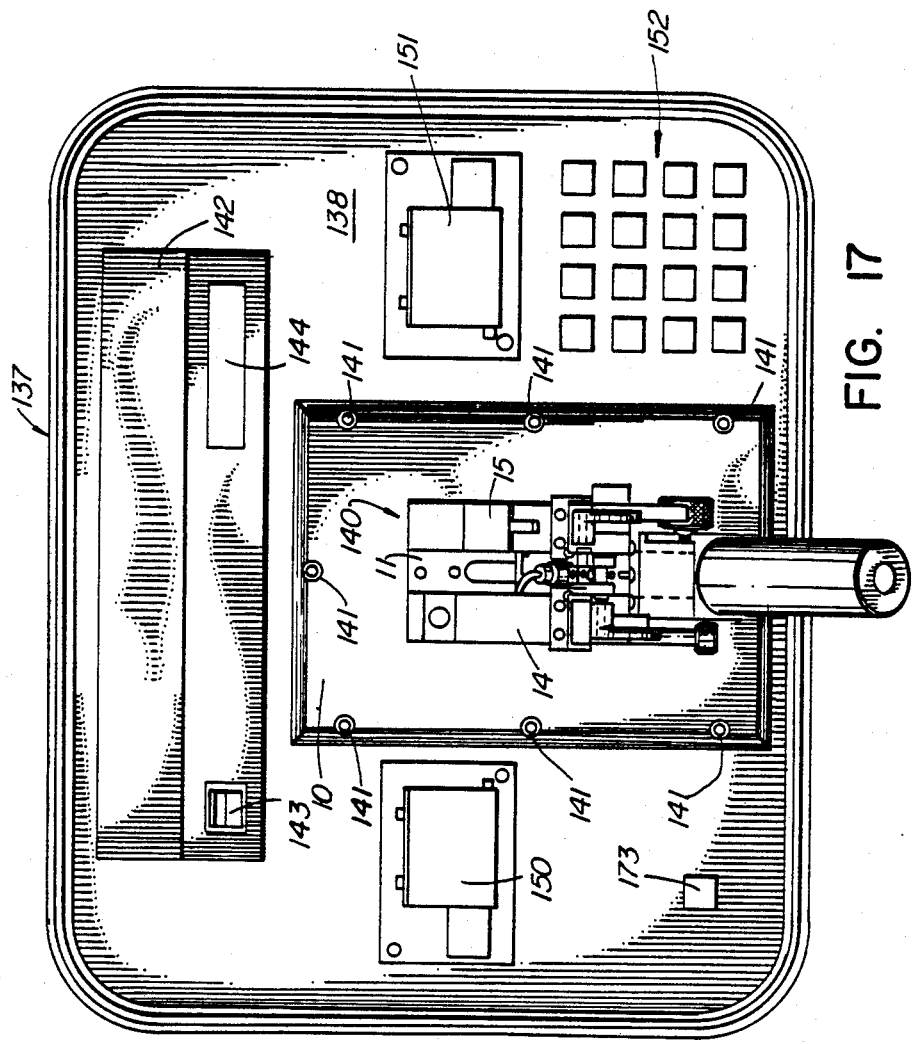
FIG. 17 is a top plan view of the fusion apparatus, including the fusion head.

The fusion splicing head is mounted, by means of the plate 10, into a fusion splicing apparatus. This is illustrated in FIG. 17. The apparatus comprises a bottom housing and a lid. In FIG. 17, the top of the bottom housing is shown. The housing indicated generally at 137, has a top surface 138. In the top surface is mounted the fusion head indicated generally at 140. The fusion head 140 is as illustrated in FIGS. 1 to 10. Plate 10 is held in position by screws at 141 and the various electronic and electrical controls, the stepping motors 20, 21 and 22, and the other items of the fusion head which extend below the plate 10 are housed in the space below the top surface 138. An elongate housing 142 extends along the rear of the top surface 138, having a power switch 143 adjacent one end and an indicator 144 adjacent the other end.

With single mode (monomode) fibers, accurate alignment of the fiber cores prior to fusion is essential. This is obtained by injecting a light signal—normally a steady light beam—into the fiber at one side of the fusion head and abstracting, or detecting, the light signal at the other side of the fusion head. By relative movement of the fiber ends the light signal can be maximized and a high degree of alignment can be obtained. The signal injector is indicated at 150 and the signal detector is indicated at 151. The fibers pass through the injector and detector. The electrical signal from detector 151 is fed to electronic circuitry in the housing 137 and also to the indicator 144.

The electronic circuitry in the housing can be arranged to produce signals which are fed to the stepping motors 20 and 21. On switching on an alignment sequence, at a switching selector dial 152, signals are sent to the motors to move the support members. As the support members are moved, the output signal from detector 151 will vary. The circuitry will use this output signal to manipulate the stepping motors such as to produce a maximum detected signal. One stepping motor will be moving one fiber end vertically and one stepping motor will be moving the other fiber end horizontally, in the example. The stepping motors are actuated sequentially until the maximum signal is detected.

Figure 18:
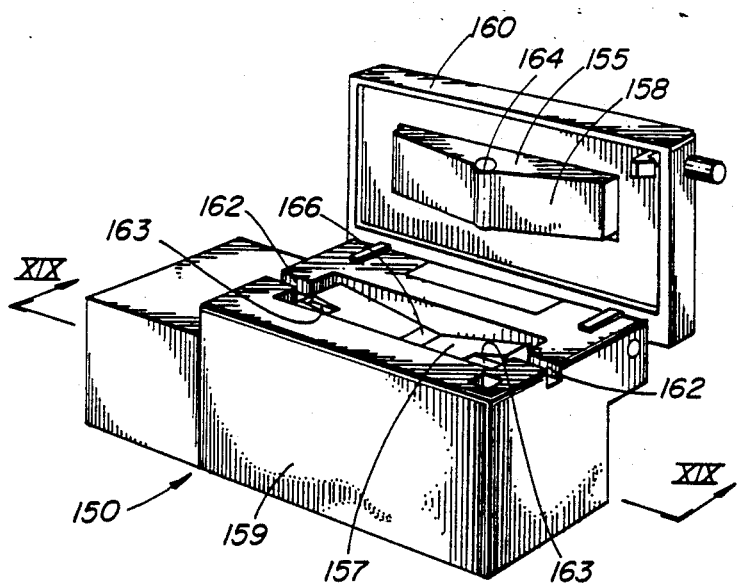
FIG. 18 is a perspective view of one form of injector or detector module as can be used in the apparatus of FIG. 17.
Figure 19:
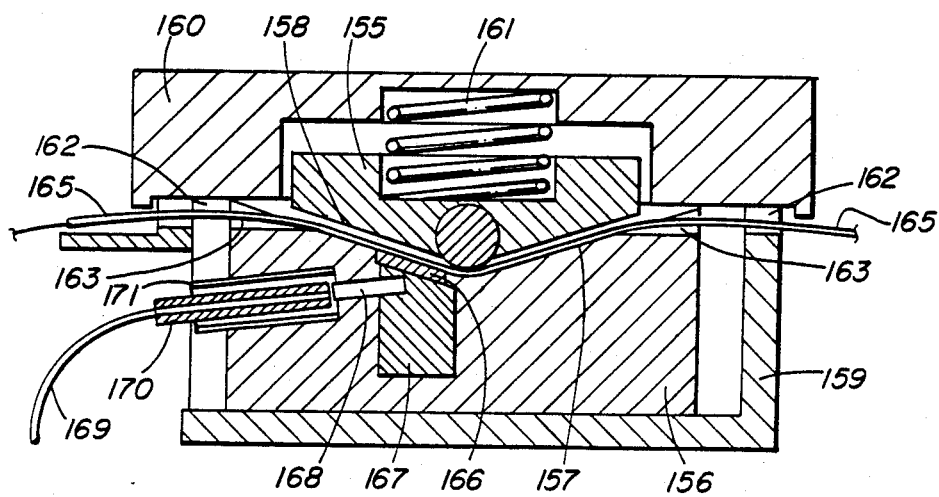
FIG. 19 is a cross-section on the line XIX—XIX of FIG. 18.

FIGS. 18 and 19 illustrate one of the injector/detector members 150, 151. The particular illustration is for an injector, although, as will be described, it can serve as a detector. As illustrated in FIGS. 18 and 19, a top block 155 and a bottom block 156 are arranged in opposition, the bottom block having a shallow Vee-shaped recess or concave form 157 on its upper surface. The top block has a shallow Vee-shaped convex shape, or form, 158, which matches the Vee-shaped recess in the bottom block. The bottom block is mounted in a lower housing 159 and the top block is mounted in a lid 160. The top block is spring biased by a compression spring 161. At each end of the housing 159 is a shallow slot 162. A further shallow slot 163 at each end of the recess 157 is aligned with the slot in the housing. An optical fiber is positioned across the injector resting in the slots 162 and 163. When the lid 160 is closed, a cylindrical surface 164 at the peak of the form 158 pushes the fiber down, as seen in FIG. 19, the fiber indicated at 165.

The bottom block has a thin insert 166 of glass adjacent to and to one side of the valley or lowest point of the concave form 157. Below the glass insert 166 is a plug 167 of transparent plastic, such as an epoxy resin. Inserted into the plug 167 is a rod 168 of graded refractive index material. The rod 168 acts as a focussing device for light emitting from a fiber pigtail 169 held in a ferrule 170 and inserted into a tubular housing 171 in the bottom block 156. The fiber pigtail is aligned at its other end with a light emitting device. Light from the light emitting device issues from the end of the fiber pigtail and is focussed by the rod 168 onto the bend formed in the fiber. This bend is such as will permit light to enter, or be injected, into the core of the fiber and thence transmitted along the fiber. A reverse arrangement of the apparatus of FIGS. 18 and 19, on the other side of the fusion head, acts to permit light to exit from the fiber at a bend, the light being focussed by a rod onto the end of a fiber pigtail which is connected at its other end to a photo-detector. The detector can be a duplicate of the arrangement illustrated in FIGS. 18 and 19, but operating in a reverse mode. The arrangement of FIGS. 18 and 19 is described in detail in copending application Ser. No. 757,696, filed July 22, 1985 in the name of the present assignee.

A microscope can be mounted at mounting position 23 for moving the ends of the fibers prior to fusing and for inspecting the fusion splice after, if desired. The microscope can be mounted so that it can be removed, or swing out of position, at will. Means may be provided for illuminating the ends of the fibers, as for example by a light emitting diode mounted in the base 11. A separate switch can be provided for the illuminating means, as shown at 173 in FIG. 17.

In a typical method or process for fusion splicing a pair of optical fibers, a series of steps or operations are carried out. With the lids of the injector/detector modules open and with the clamping members 16 and 17 open, a first fiber is positioned on one side. The fiber end is positioned in the Vee formations 98 and 101 of the guiding and locating members, e.g. member 12, resting on the endless belt 18, or other laterally movable member. The clamping member is then closed, the fiber being firmly pushed down into the Vee formation 101 by the pressure member 114, and the injector module 150 closed. The second fiber is then positioned in the same way, the clamping member closed, and then the detector module 151 closed. The approximate position of the ends of the fibers can be checked by the microscope. The positions of the ends of the fibers, relative to each other and relative to the electrodes 135 of the fusion head, can be adjusted by the knobs 19. Illumination of the fiber ends by the illuminating device can assist in viewing the fiber ends.

Figure 20:
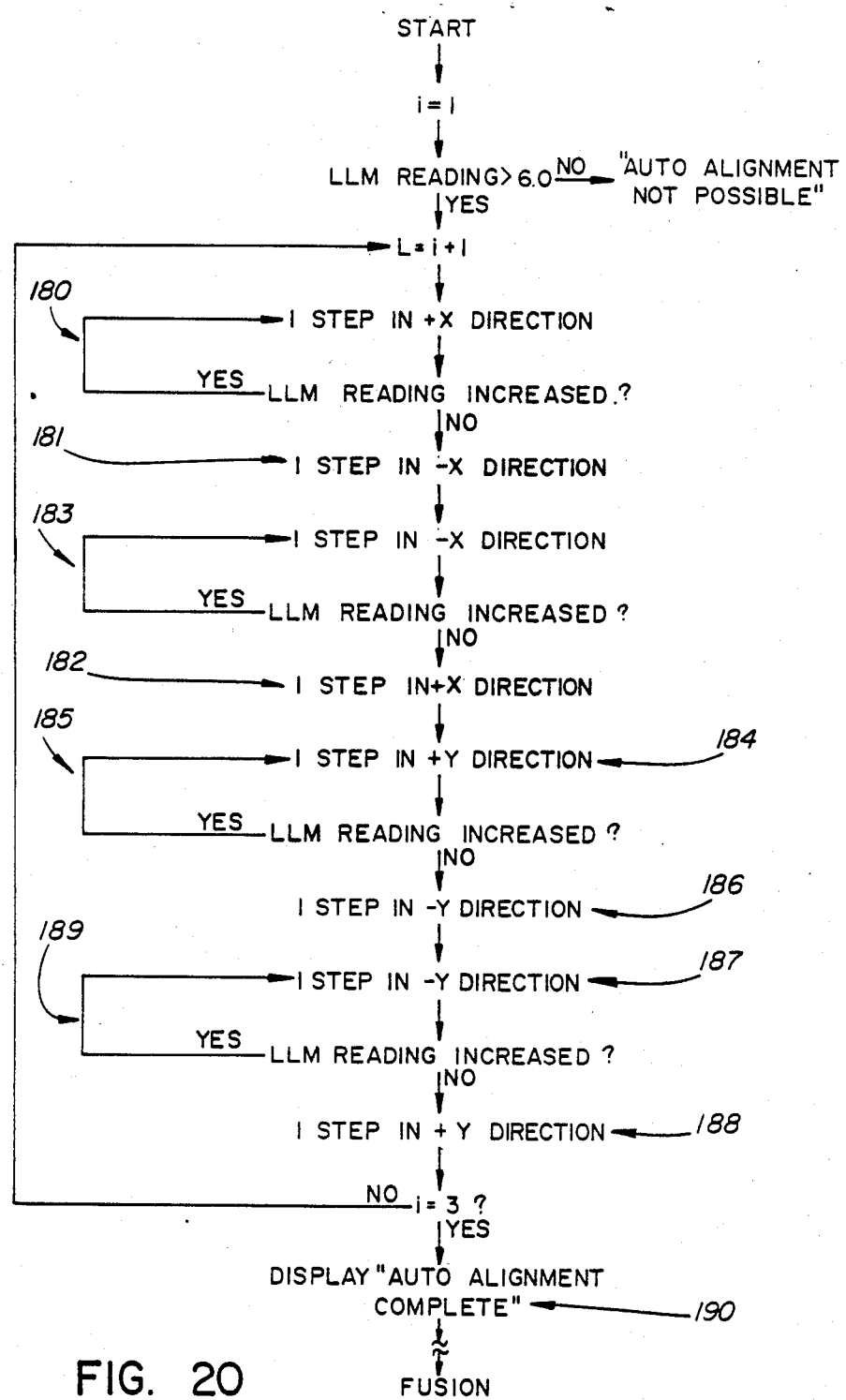
FIG. 20 is a "flow chart" illustrating the alignment cycle for aligning the optical fibers prior to fusion.

A light signal is then injected into one fiber and detected in the other fiber. A reading of a light level meter associated with the detector is indicated on the indicator 144. An automated cycle can then be initiated, with the appreciation that stepping motor 20 moves the related guiding and locating member 12 along the Y axis and stepping motor 21 moves its related guiding and locating member 13 along the X axis. Stepping motor 22 moves the clamping member 17 along the Z axis. The sequence up to displaying that alignment is complete is illustrated in FIG. 20. On initiation of the alignment cycle, stepping motor 22 is caused to move clamping member 17 to separate the fiber ends. There is then normally produced a low power arc between electrodes 135 to preclean the ends of the fibers.

The light detected by the detector 151 is fed to the electronic measuring circuit of the electronic control system in the housing 137. The light level is metered and if it has a predetermined value, the cycle can start. Thus, considering FIG. 20, the cycle starts and a cycle indicator (i) registers 1. If the light level measure (LLM) is not more than the predetermined value, for example 6.0, auto-alignment is not possible and is so indicated. If the LLM reading is over 6.0, then the auto-alignment starts. The cycle indicator is raised by 1 ($i'=i+1=2$) and the circuit sends a pulse to the stepping motor 21 to make 1 step in the +X direction. If the LLM increases, then the circuit sends a further pulse to motor 21 to make a further step in the +X direction. This sequence, indicated at 180, is repeated until no increase in the LLM occurs. On no increase, the circuit sends a pulse to motor 21 to make 1 step in the −X direction, as at 181. The circuit then sends a pulse for motor 21 to make another step in the −X direction and, if no increase in the LLM occurs (the normal condition), the stepping motor is caused to step in the +X direction, as at 182. If the original step in the +X direction had not resulted in an LLM increase and the cycle had proceeded to the −X steps, then it could be that a series of steps in the −X direction could have occurred until a no increase in LLM occurred for this direction of movement, as at 183. Essentially, the circuit causes stepping of motor 21, in one direction or the other, until a maximum reading of the LLM for the X axis has been obtained.

Having reached the condition where a maximum reading of the LLM for the X axis has been obtained, the process is repeated for the Y axis. In the example as in FIG. 14, the stepping motor 20 receives a pulse to step once in the +Y direction—184. If an increase in the LLM occurs, this stepping continues until no increase is detected—185. When no increase in LLM occurs after a +Y step, the motor 20 is caused to step once in the −Y direction—186. A further step in the −Y direction is caused—187. If no increase in the LLM occurs, then a step in the +Y direction is caused—188. If an increase in the LLM is detected after the step in the −Y direction, then a further step, or further steps, in the −Y direction is carried out—189. If a series of steps in the +Y direction occurred, at 185, to obtain a maximum LLM reading, then normally there would not be a series of −Y steps, at 189. Conversely, if a series of steps in the Y direction was not carried out, then a series of steps in the −Y direction are likely to occur. Essentially, the stepping motor 20 is caused to step in one direction or the other until a maximum value for LLM for the Y axis is obtained.

The situation is then that the maximum value for LLM, for both axes, has been obtained—presuming that the fiber cores are therefore aligned. The electronic circuit then inspects the cycle indicator. If i' is not at 3, then the whole cycle is repeated. At the commencement of a further cycle, the circuit adds 1 digit to the cycle indicator. At the end of the second cycle, the cycle indicator will indicate 3. On detecting that the cycle indicator is at 3, there is indicated, or displayed, "auto-alignment complete"—190.

The above cycles can also be carried out manually by pushing particular buttons on the pad 152. Thus one button is for single steps in the +X direction, another in the −X direction and two further buttons for single steps in the +Y and −Y direction. Thus the cycle as illustrated in FIG. 20 can be carried out manually. This can be done when, for any reason, a light signal is not injected, or detected, by the modules 150 and 151. Whether the X axis is cycled before the Y axis is a matter of choice. Whether only one complete cycle is carried out, or more than one, is also a matter of choice.

Once the alignment is obtained, fusion can be carried out. Pushing the "fuse" button in the pad 152 initiates the fusion cycle. In one arrangement, a relatively low power arc is generated between the electrodes 135 and the ends of the fibers softened. A higher power arc then melts the ends of the fibers and the electronic circuit causes the stepping motor 22 to pivot clamping member 17 so as to push the ends of the fiber together. The arc power is reduced, to permit cooling, and then the arc is switched off and the joint solidifies, producing a fused joint between the fibers. The fusion cycle is then indicated as finished. The particular programme of low and high power arcs: cleaning, softening, fusing and cooling steps; and other controllable variables, can be modified as desired.

What is claimed is:

1. A fusion apparatus for fusion splicing a pair of single mode optical fibers, including a fusion head assembly, said assembly comprising:

two spaced apart guiding and locating members for positioning said fibers in an end-to-end axial alignment, a guiding and locating member for each fiber, the guiding and locating member spaced apart along the axis of said alignment;

a backbone member, and a mounting member for each guiding and locating member, each mounting member comprising an integral hinge member having a fixed part and a pivotal part, each hinge member comprising a block mounted on said backbone, a slot extending through the block to an end at a position adjacent one edge of said block to divide said block into said fixed and pivotal parts, and a neck portion at said end, said parts hingedly connected at said neck portion, a guiding and locating member mounted on each pivotal part of each mounting member for movement of the guiding and locating members relative to each other along axes normal to each other and also normal to the alignment axis;

means for actuating the pivotal part of each hinge member to move said guiding and locating members;

a fusion head positioned between said guiding and locating members, said fusion head including two opposed electrodes positioned either side of a joint position of said fibers;

clamping members for holding said fibers in said guiding and locating members, a clamping member for each guiding and locating member; each clamping member having a lower main body member and a spring biased holding member pivotally mounted on the body member and movable from an open position to a closed position; a laterally movable member on each guiding and locating member, said spring biased holding member extending over and holding a fiber onto said laterally movable member when in said closed position, and means for moving said laterally movable member;

means mounting one of said clamping members on the related mounting member for pivotal movement in a plane parallel to the alignment axis for reciprocal movement of one fiber axially relative to the other fiber, and means for pivotally moving said one clamping member.

2. Apparatus as claimed in claim 1, each said guiding and locating member having two spaced Vee formations, and a said laterally movable member positioned between said Vee formations.

3. Apparatus as claimed in claim 1, said means for actuating said hinge members comprising a first actuating means on each hinge member for providing an initial actuation of each hinge member, and a second actuating means for each hinge member for separate and individual actuation of each hinge member.

4. Apparatus as claimed in claim 3, said second actuating means comprising a stepping motor, a micrometer attached to said pivotable part of the hinge member and means connecting said stepping motor to said micrometer, said stepping motor arranged to rotate said micrometer in either direction for movement of said pivotable part of said hinge member.

5. Apparatus as claimed in claim 1, each guiding and locating member comprising an elongate back part and two spaced apart arms extending forward from said back part, a first arm positioned adjacent to said joint position of said fibers and a second arm remote from said joint position, said first arm having a Vee formation in a top surface, said second arm having three sections, a central section and two side sections, said central section having a Vee formation in an upper surface, said side sections having flat surfaces.

6. Apparatus as claimed in claim 5, the laterally movable member and clamping member positioned between said arms.

7. Apparatus as claimed in claim 6, including pressure means resiliently mounted on each spring biased holding member.

8. Apparatus as claimed in claim 7, said pressure member aligned with said second arm, including a rod extending laterally from said holding member over said second arm, said pressure member having a central aperture extending over said rod, said aperture elongate to permit movement of said pressure member towards and away from said second arm, a central slot in said pressure member, said central section of said second arm aligned with said slot, and a compression spring positioned between said rod and a surface on said aperture on the side of said rod adjacent to said second arm.

9. Apparatus as claimed in claim 1, a fixed part of each hinge member connected to said backbone member; one of said clamping members fixedly attached to the fixed part of one hinge member; the other of said clamping members pivotally mounted on the fixed part of the other hinge member, at an end of the clamping member remote from said holding member, said other clamping member positioned against a side surface of said backbone member; a lever pivotally mounted at a position intermediate its ends in said other clamping member, one end of said lever in contact with said surface of said backbone member; means for moving the other end of said lever, whereby pivotting of said lever pivots said other clamping member on said other hinge member and moves said holding member laterally.

10. Apparatus as claimed in claim 9, said means for moving said other end of said lever comprising; a stepping motor; a rotatable member driven by said stepping motor, said rotatable member rotating about the pivotal axis of said other clamping member on said other hinge member; and a projection on said rotatable member in engagement with said other end of said lever.

11. Apparatus as claimed in claim 1, including a mounting plate, said fusion head assembly mounted on said mounting plate.

12. Apparatus as claimed in claim 11 further including a bottom housing, said housing including a top surface, said mounting plate mounted on said top surface.

13. Apparatus as claimed in claim 12, including an elongate housing on said top surface and an indicator in said elongate housing.

14. Apparatus as claimed in claim 12, including two modules mounted on said top surface, a module positioned on each side of said fusion head assembly, means for positioning said fibers in said modules, a fiber in each module, and means for injecting a light signal into a fiber at one module and for detecting a light signal at the other module.

* * * * *